(12) United States Patent
Shim et al.

(10) Patent No.: US 11,186,525 B2
(45) Date of Patent: *Nov. 30, 2021

(54) METHOD TO PRODUCE A PROTECTIVE SURFACE LAYER HAVING A PREDETERMINED TOPOGRAPHY ON A CERAMIC MATRIX COMPOSITE

(71) Applicant: Rolls-Royce High Temperature Composites Inc., Cypress, CA (US)

(72) Inventors: Sungbo Shim, Irvine, CA (US); Pathikumar Sellappan, Seal Beach, CA (US)

(73) Assignee: ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 16/524,397

(22) Filed: Jul. 29, 2019

(65) Prior Publication Data
US 2021/0032172 A1    Feb. 4, 2021

(51) Int. Cl.
*C04B 41/87* (2006.01)
*C04B 41/50* (2006.01)
*C04B 41/45* (2006.01)
*C04B 35/83* (2006.01)
*C04B 35/645* (2006.01)

(52) U.S. Cl.
CPC .............. *C04B 41/87* (2013.01); *C04B 35/83* (2013.01); *C04B 41/4515* (2013.01); *C04B 41/5059* (2013.01); *C04B 41/5066* (2013.01)

(58) Field of Classification Search
CPC . C04B 35/657; C04B 35/806; C04B 35/6261; C04B 35/62655; C04B 35/62863; C04B 35/62892; C04B 35/62894; C04B 35/62897; C04B 2235/428; C04B 2235/612; C04B 2235/616; C04B 2235/5244; C04B 2235/3826
See application file for complete search history.

(56) References Cited

U.S. PATENT DOCUMENTS

| | | | |
|---|---|---|---|
| 5,015,540 A * | 5/1991 | Borom | C04B 35/62884 428/698 |
| 5,840,221 A * | 11/1998 | Lau | C04B 35/565 264/29.7 |
| 10,745,325 B2 * | 8/2020 | Shim | C04B 35/657 |
| 2006/0141154 A1 * | 6/2006 | Thebault | C04B 41/009 427/249.2 |

(Continued)

*Primary Examiner* — Alex B Efta
(74) *Attorney, Agent, or Firm* — Crowell & Moring LLP

(57) ABSTRACT

A method to produce a protective surface layer having a predetermined topography on a ceramic matrix composite is described. The method includes applying a slurry layer to a surface of a fiber preform, and drying the slurry layer to form a particulate layer. A surface of the particulate layer is machined to improve surface smoothness and to form a machined surface. A ceramic tape is attached to the machined surface, and a tool comprising one or more features to be imprinted is placed on the ceramic tape, thereby forming a compression assembly. Heat and pressure are applied to the compression assembly to consolidate and bond the ceramic tape to the machined surface, while the one or more features of the tool are imprinted. Thus, a protective surface layer having a predetermined topography is formed.

20 Claims, 2 Drawing Sheets

(56) References Cited

U.S. PATENT DOCUMENTS

| | | | |
|---|---|---|---|
| 2007/0092762 A1* | 4/2007 | Corman | C04B 35/62871 |
| | | | 428/701 |
| 2016/0159066 A1* | 6/2016 | Landwehr | C04B 37/008 |
| | | | 428/699 |
| 2016/0214907 A1* | 7/2016 | Shim | C04B 41/52 |
| 2016/0230570 A1* | 8/2016 | Harris | C04B 41/009 |
| 2016/0326064 A1* | 11/2016 | Shim | F01D 5/282 |
| 2019/0256427 A1* | 8/2019 | Shim | C04B 35/62655 |

* cited by examiner

METHOD TO PRODUCE A PROTECTIVE SURFACE LAYER HAVING A PREDETERMINED TOPOGRAPHY ON A CERAMIC MATRIX COMPOSITE

TECHNICAL FIELD

The present disclosure relates generally to the fabrication of a ceramic matrix composite (CMC) and more particularly to formation of a protective surface layer on a CMC.

BACKGROUND

Ceramic matrix composites, which include ceramic fibers embedded in a ceramic matrix, exhibit a combination of properties that make them promising candidates for industrial applications, such as gas turbine engines, that demand excellent thermal and mechanical properties along with low weight. A ceramic matrix composite that includes a silicon carbide matrix reinforced with silicon carbide fibers may be referred to as a silicon carbide/silicon carbide composite or SiC/SiC composite. Fabrication of SiC/SiC composites typically includes a melt infiltration step in which a SiC fiber preform is exposed to molten silicon, which is drawn into the (porous) fiber preform via capillary forces and reacts to form the SiC matrix. After melt infiltration and cooling, the densified ceramic matrix composite (CMC) may undergo a machining step to produce the desired surface topography. However, testing shows that machining may lead to exposure of CMC fibers and also introduce flaws, making the CMC susceptible to accelerated structural degradation upon exposure to high temperature operating conditions.

BRIEF DESCRIPTION OF THE DRAWINGS

The embodiments may be better understood with reference to the following drawing(s) and description. The components in the figures are not necessarily to scale. Moreover, in the FIGURES, like-referenced numerals designate corresponding parts throughout the different views.

DETAILED DESCRIPTION

FIGS. 1A-1F illustrate a new method for producing three-dimensional surface features on CMCs that avoids the damage inherent to machining. CMCs prepared as described herein may include a protective surface layer having a predetermined topography and surface features beneficial for gas turbine engine components.

Figure 1A:
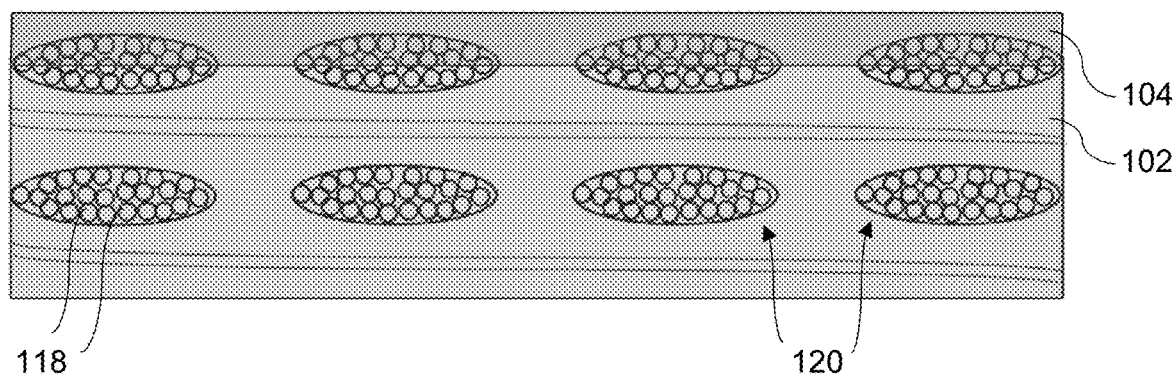
FIGS. 1A-1F are cross-sectional schematics showing an exemplary method of forming a protective surface layer having a predetermined topography on a CMC.
Figure 1B:
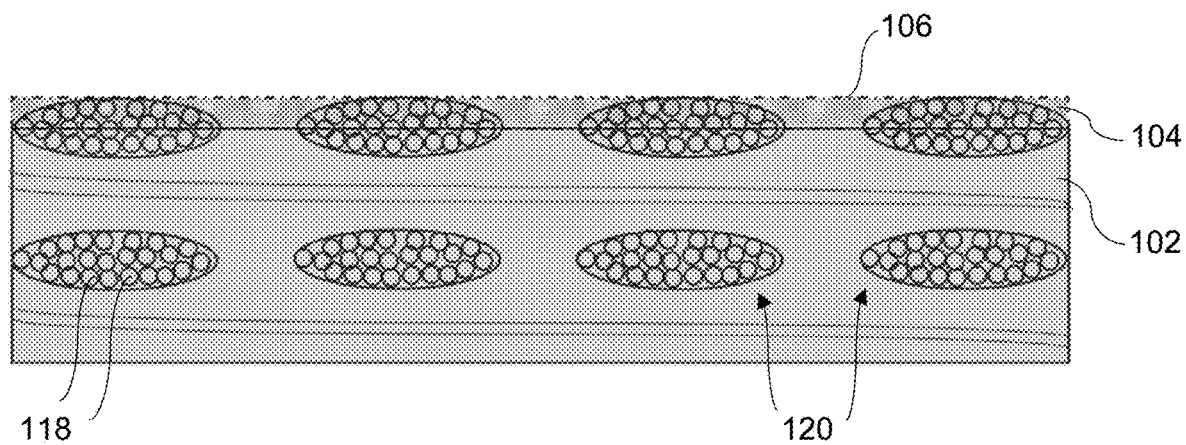
Figure 1C:
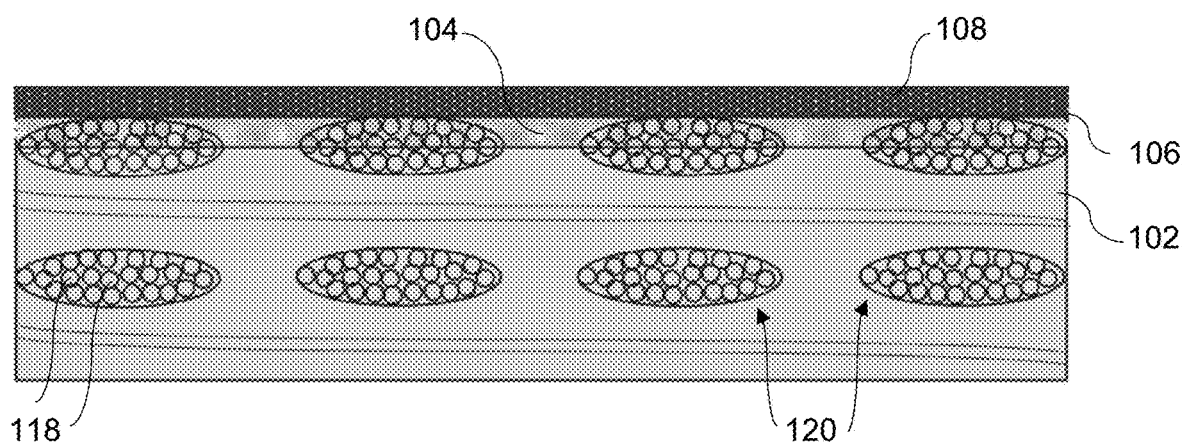
Figure 1D:
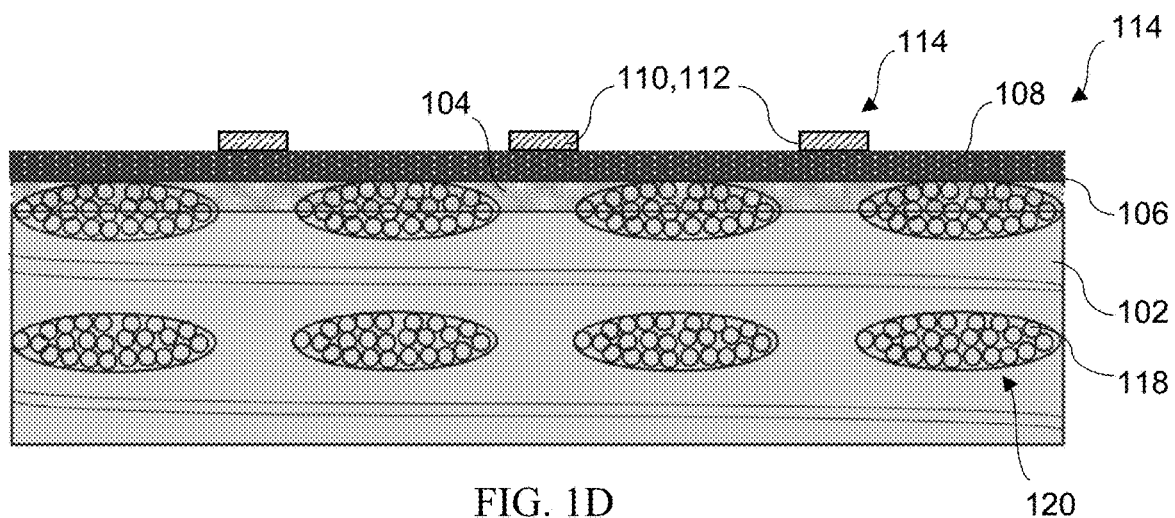
Figure 1E:
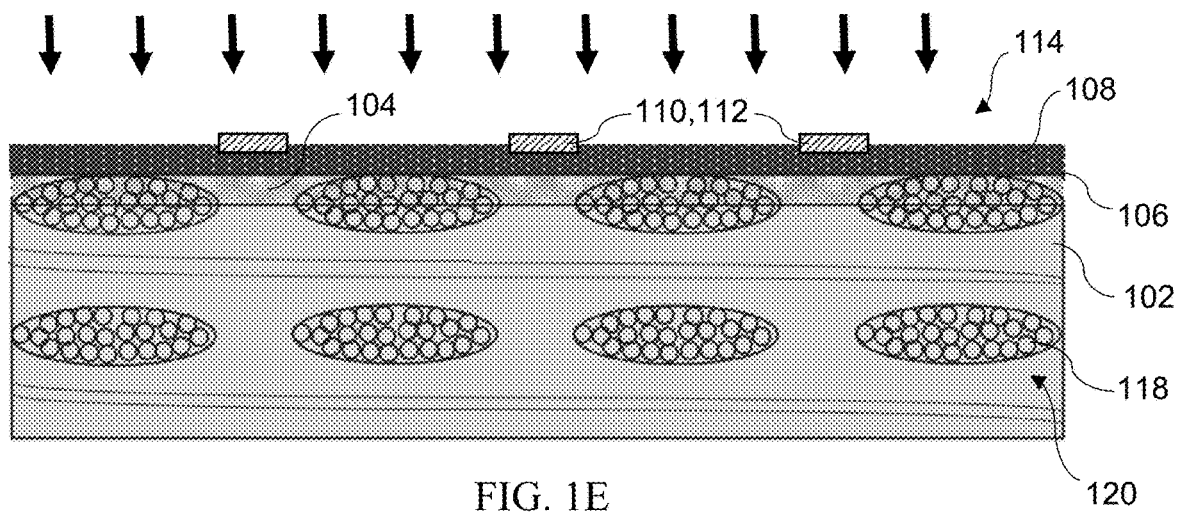
Figure 1F:
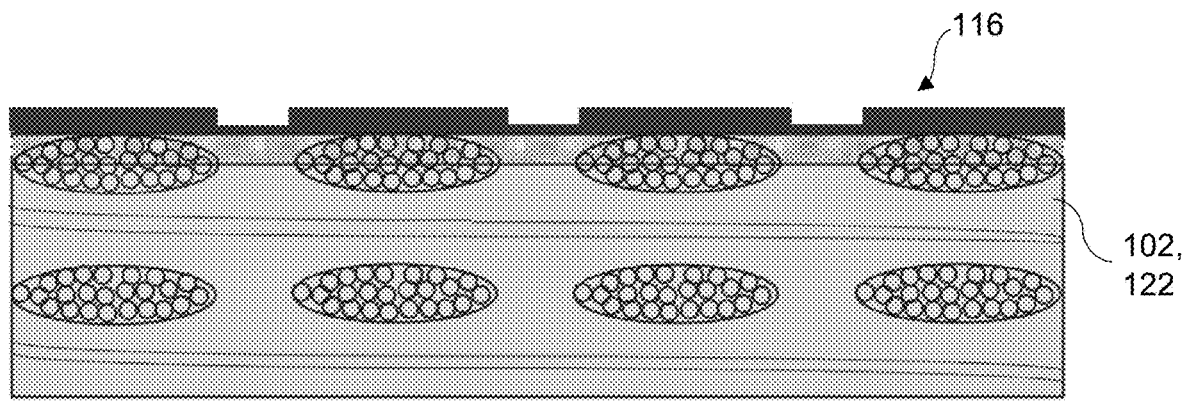

The method comprises applying a slurry layer to a surface of a fiber preform 102, and drying the slurry layer to form a particulate layer 104, as shown in FIG. 1A. A surface of the particulate layer 104 is machined to improve surface smoothness, thereby producing a machined surface 106, as illustrated in FIG. 1B. A ceramic tape 108 is attached to the machined surface 106, as shown in FIG. 1C, and a tool 110 comprising one or more features 112 to be imprinted is placed on the ceramic tape 108, as illustrated in FIG. 1D, thereby forming a compression assembly 114. Heat and pressure are applied to the compression assembly 114 to consolidate and bond the ceramic tape 108 to the machined surface 106 while the one or more features 112 are imprinted, as shown in FIG. 1E. After consolidation and bonding, the tool 110 is removed. As shown in FIG. 1F, a protective surface layer 116 having a predetermined topography and comprising one or more surface features is thus formed.

The fiber preform 102 to which the slurry layer is applied may be a slurry-infiltrated fiber preform or a melt-infiltrated fiber preform. In other words, the slurry layer may be applied to a fiber preform 102 that has undergone slurry infiltration, but not melt infiltration (a slurry-infiltrated fiber preform), or to a fiber preform 102 that has undergone both slurry infiltration and melt infiltration (a melt-infiltrated fiber preform). The slurry-infiltrated fiber preform is impregnated with ceramic particles but not densified and thus may be referred to as an impregnated fiber preform; the melt-infiltrated fiber preform has undergone densification and thus may be referred to as a ceramic matrix composite. Accordingly, when the slurry layer is applied to a melt-infiltrated preform, the protective surface layer 116 is formed on a ceramic matrix composite 122. When the slurry layer is applied to an impregnated fiber preform, the method described in reference to FIGS. 1A-1F may be followed by melt infiltration to form a ceramic matrix composite 122 having the protective surface layer 116. The surface features formed in the protective surface layer 116 are retained after melt infiltration. As discussed further below, slurry infiltration may be preceded by other process steps, such as construction of the fiber preform using fiber assembly and lay-up methods known in the art, and coating deposition using chemical vapor infiltration and/or other methods.

The slurry layer may comprise ceramic particles in a carrier liquid, which is removed upon drying to form the particulate layer 104. The carrier liquid may comprise an aqueous or organic liquid, such as water, ethanol, methanol, isopropyl alcohol, methyl ethyl ketone, and/or toluene. The ceramic particles may include silicon carbide particles, silicon nitride particles, and/or silicon nitrocarbide particles; typically, the ceramic particles comprise silicon carbide particles. The slurry layer may further comprise other particles, such as silicon particles, carbon particles and/or other reactive particles (e.g., particles that may react with a molten material upon melt infiltration, which may take place after formation of the protective surface layer 116). Typically, the ceramic particles and (optional) other particles may have a width or diameter in a range from about 0.5 micron to about 20 microns. The particulate layer 104 formed upon drying also comprises the ceramic particles and any other particles incorporated into the slurry layer.

The slurry layer may be applied by spraying, spin coating, dipping, brushing, or another deposition method known in the art. Typically, application of the slurry layer is carried out under ambient conditions, such as at atmospheric pressure, in air, and/or at room temperature (20-25° C.). Drying of the slurry layer to remove the carrier liquid and form the particulate layer 104 may be carried out at room temperature or at an elevated temperature (e.g., from about 30° C. to about 200° C.). Drying may take place under ambient conditions or in a controlled environment, such as under vacuum conditions or in an inert gas atmosphere. A typical time duration for drying is from about two hours to about 24 hours.

The machining or grinding of the particulate layer 104 to form the machined surface 106 may be carried out using sandpaper, a grinding tool, an abrasive slurry/pad, and/or another green machining method known in the art. After machining, the machined surface 106 may have an average surface roughness $R_a$ of about 100 micro-in or less. Typically, the particulate layer 104 has a thickness in a range from about 10 micron to about 100 microns after machining.

The ceramic tape 108 attached to the machined surface 106 may comprise ceramic particles and an organic binder. The ceramic tape 108 may further include a dispersant or surfactant and optionally one or more plasticizers. The organic binder may comprise polyethylene glycol, an acrylate co-polymer, a latex co-polymer, and/or polyvinyl butyral, and the dispersant may comprise ammonium polyacrylate, polyvinyl butyral, a phosphate ester, polyethylene imine, and/or BYK® 110 (Byk USA, Wallingford, Conn.). The ceramic particles may comprise silicon carbide particles, silicon nitride particles, and/or silicon nitrocarbide particles; typically, the ceramic particles comprise silicon carbide particles. The ceramic particles employed for the ceramic tape and the slurry layer (and thus the particulate layer 104) may be the same or different. Like the slurry layer, the ceramic tape may further comprise other particles, such as silicon particles, carbon particles and/or other types of reactive particles. The ceramic and (optional) other particles used in the ceramic tape 108 typically have a width or diameter in a range from about 0.5 micron to about 20 microns. The protective surface layer 116 formed from consolidation and bonding of the ceramic tape 108 with the machined surface 106, as shown in FIGS. 1E and 1F, may include sintered particles comprising silicon carbide, silicon nitride, silicon nitrocarbide, silicon, carbon, and/or other materials.

The ceramic tape 108 may be prepared by tape casting a water-based slurry comprising the ceramic particles, the optional other particles, the organic binder, a dispersant, a surfactant and/or a plasticizer onto a flexible polymeric sheet, followed by drying of the slurry and separation of the ceramic tape 108 from the polymeric sheet. Typically, the ceramic tape 108 has a solids loading of about 60-70 vol. %. The ceramic tape 108 may have a thickness in a range from about 50 µm to about 250 µm. Prior to applying the ceramic tape 108 to the machined surface 106, an adhesive may deposited thereon (e.g., by spraying) to promote attachment of the tape 108. Typically, the adhesive comprises the organic binder used in the ceramic tape 108.

It is understood that at least one ceramic tape 108 is applied to the machined surface 106; however, additional ceramic tapes 108 may be applied as needed to cover some or all of the machined surface and/or to provide the desired thickness. Accordingly, the term "ceramic tape" as used in this disclosure is understood to refer to any and/or all ceramic tapes 108 applied to the machined surface 106. When more than one ceramic tape 108 is employed, the ceramic tapes 108 may be applied in an overlapping or non-overlapping configuration on the machined surface 106.

Once the ceramic tape 108 is secured to the machined surface 106, a tool 110 comprising one or more features 112 to be imprinted is positioned on the ceramic tape 108, as shown in FIG. 1D. The tool 110 may comprise a single piece or multiple pieces, and may have a feature or shape determined by the desired topography of the protective surface layer 116. For example, the tool 110 may comprise a shape configured to create a recessed surface feature in the protective surface layer 116, and/or the tool 110 may comprise a shape configured to create a protruding surface feature in the protective surface layer 116. Exemplary surface features that may be formed in the protective surface layer 116 include, for example, seal slots, antirotation slots, and/or loading pads, all of which may be employed for gas turbine engine components. The tool 110 may be made of a sufficiently rigid material such as polytetrafluoroethene (PTFE) (Teflon) and/or stainless steel that does not react with constituents of the ceramic tape 108 or undergo any substantial shape change during the application of pressure and heat.

Applying heat and pressure to the compression assembly 114 may entail vacuum bagging, autoclaving, laminating, and/or mechanical pressing. The compression assembly may be heated at a consolidation temperature in a range from about 80° C. to about 200° C., while a suitable applied pressure may lie in a range from about 500 psi to about 50,000 psi (50 ksi). The pressure and heat may be applied in a controlled environment (e.g., a vacuum or inert gas atmosphere). Typically, the application of heat and pressure takes place for a time duration in a range from about 30 minutes to about 2 hours. After consolidation and bonding of the ceramic tape 108 and imprinting of the one or more features 112, the tool 110 may be removed, revealing the protective surface layer 116. The protective surface layer 116 may be described as a ceramic layer having a predetermined topography. The protective surface layer 116 may comprise silicon carbide, silicon nitride, silicon nitrocarbide, and/or another ceramic, and preferably includes a small amount of (e.g., about 5-15 vol. % or less) unreacted silicon or carbon.

The compression assembly 114 may include the tool 110, the ceramic tape 108, the particulate layer 104 with the machined surface 106, and the fiber preform 102. In some examples, the compression assembly 114 may further include flexible compression multilayers in contact with the fiber preform 102 and the tool 110 to help maintain the position of the ceramic tape 108 and the features 112 during consolidation. For example, vacuum bagging may utilize a flexible compression multilayer on opposing sides of the fiber preform 102. The flexible compression multilayer may comprise, in one example, a release film on the tool 110, a breather cloth on the release film, and an elastomeric sheet on the breather cloth, and (on the opposing side) a release film on the fiber preform 102, a breather cloth on the release film, and an elastomeric sheet on the breather cloth. The compression assembly 114 may be placed on a substrate, such as an aluminum plate, and sealed within polymeric sheets for vacuum bagging. The use of vacuum bagging to apply heat and pressure to the compression assembly 114 allows the ceramic tape 108 to be consolidated and bonded to a fiber preform 102 of any arbitrary shape or size.

During vacuum bagging, the compression assembly 114 sealed within the polymeric sheets may be pumped continuously to maintain a suitable vacuum. While under vacuum, the compression assembly 114 may be heated to a desired consolidation temperature, which is typically in a range from about 90° C. to about 150° C., as described above. The heating may be carried out in a furnace. The compression assembly 114 may be maintained at the consolidation temperature for a period from about 30 minutes to 2 hours to form the protective surface layer 116. After the application of heat and pressure, the fiber preform or composite 102, 122 comprising the protective surface layer 116 may be cooled and unsealed, and the tool 110 may be removed.

As indicated above, the method may further comprise, prior to applying the slurry layer, forming and processing the fiber preform 102. The fiber preform 102 may comprise a three-dimensional framework of ceramic fibers 118, which may be arranged in tows 120 as illustrated in FIGS. 1A-1F. The framework may be formed by, in one example, laying up plies comprising tows 120 of ceramic fibers 118 arranged in a two- or three-dimensional weave. The method may further comprise, before or after forming the framework, forming an interface coating on the ceramic fibers to provide a weak fiber-matrix interface once the CMC is formed, which can be beneficial for fracture toughness. The method may also include forming a rigidized fiber preform by depositing a matrix material such as silicon carbide on the fiber preform via chemical vapor infiltration or another deposition process known in the art. The fiber preform, which may be a rigidized fiber preform as described above, may be infiltrated with a slurry comprising ceramic particles and optionally reactive elements/particles to form an impregnated fiber preform, i.e., a fiber preform loaded with particulate matter (ceramic and optionally other particles), prior to application of the slurry layer, as discussed above. Typically, the impregnated fiber preform comprises a loading level of particulate matter from about 40 vol. % to about 60 vol. %, with the remainder being porosity. In addition, the method may further comprise, after applying the heat and pressure to form the protective surface layer 116, melt infiltrating the fiber preform 102 followed by cooling, thereby forming a ceramic matrix composite 122 that has the protective surface layer 116. In embodiments where the particulate layer 104 is formed on a fiber preform 102 comprising a melt-infiltrated preform, as discussed above, the ceramic matrix composite 122 is already present during the formation of the protective surface layer 116.

During melt infiltration, the molten material infiltrated into the fiber preform (which may be a rigidized and/or impregnated fiber preform as described above) may consist essentially of silicon (e.g., elemental silicon and any incidental impurities) or may comprise a silicon-rich alloy. Melt infiltration may be carried out at a temperature at or above the melting temperature of silicon or the silicon alloy which is infiltrated. Thus, the temperature for melt infiltration is typically in a range from about 1350° C. to about 1500° C. A suitable time duration for melt infiltration may be from 15 minutes to four hours, depending in part on the size and complexity of the ceramic matrix composite to be formed. A ceramic matrix is formed from ceramic particles as well as ceramic reaction products created from the reaction between the molten material and any other particles (e.g., carbon particles, refractory metal particles) in the fiber preform. When melt infiltration takes place after the protective surface layer 116 is formed, the protective surface layer 116 may comprise sintered particles as described above (e.g., sintered ceramic particles) as well as ceramic reaction products from reactions between the molten material and any reactive particles included in the tape 108 or particulate layer 104.

The ceramic fibers that serve as the framework of the fiber preform typically comprise silicon carbide, but may also or alternatively comprise another ceramic, such as silicon nitride, alumina, or aluminosilicate, or carbon. The ceramic matrix composite typically has a matrix comprising silicon carbide. In some examples, the ceramic matrix composite may be referred to as a SiC/SiC composite. The ceramic matrix composite may form part or all of a component of a gas turbine engine, such as a blade or vane.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of forming a protective surface layer having a predetermined topography on a ceramic matrix composite. The method includes applying a slurry layer to a surface of a fiber preform and drying the slurry layer to form a particulate layer. A surface of the particulate layer is machined to improve surface smoothness and to form a machined surface. A ceramic tape is attached to the machined surface, and a tool comprising one or more features to be imprinted is placed on the ceramic tape, thereby forming a compression assembly. Heat and pressure are applied to the compression assembly to consolidate and bond the ceramic tape to the machined surface, while the one or more features of the tool are imprinted. Thus, a protective surface layer having a predetermined topography is formed.

A second aspect relates to the method of the first aspect, wherein the fiber preform comprises a slurry-infiltrated fiber preform or a melt-infiltrated fiber preform.

A third aspect relates to the method of the second aspect, wherein the fiber preform comprises the slurry-infiltrated fiber preform, and further comprising, after forming the protective surface layer, infiltrating the fiber preform with a molten material and cooling, thereby forming a ceramic matrix composite having the protective surface layer, where the predetermined topography is maintained after melt infiltration.

A fourth aspect relates to the method of the second aspect, wherein the fiber preform comprises the melt-infiltrated fiber preform, and wherein the protective surface layer is formed on a ceramic matrix composite.

A fifth aspect relates to the method of any preceding aspect, wherein the slurry layer is applied by spraying, spin coating, dipping, or brushing.

A sixth aspect relates to the method of any preceding aspect, wherein the slurry layer comprises ceramic particles in a carrier liquid comprising an aqueous or organic liquid, the carrier liquid being removed upon drying.

A seventh aspect relates to the method of the sixth aspect, wherein the ceramic particles are selected from the group consisting of: silicon carbide particles, silicon nitride particles, and silicon nitrocarbide particles, and wherein the slurry layer further comprises other particles selected from the group consisting of: silicon and carbon.

A eighth aspect relates to the method of any preceding aspect, wherein drying is carried out at room temperature for a time duration from two hours to 24 hours.

A ninth aspect relates to the method of any preceding aspect wherein, after machining, the machined surface has an average surface roughness $R_a$ of about 100 micro-in or less.

A tenth aspect relates to the method of any preceding aspect, wherein the ceramic tape comprises ceramic particles and an organic binder, the ceramic particles being selected from the group consisting of: silicon carbide particles, silicon nitride particles, and silicon nitrocarbide particles.

An eleventh aspect relates to the method of the tenth aspect, wherein the ceramic tape further comprises other particles selected from the group consisting of: silicon and carbon.

A twelfth aspect relates to the method of any preceding aspect, wherein the ceramic tape has a thickness in a range from about 50 µm to about 250 µm.

A thirteenth aspect relates to the method of the tenth aspect, wherein, prior to attaching the ceramic tape to the machined surface, an adhesive comprising the organic binder is deposited onto the machined surface.

A fourteenth aspect relates to the method of any preceding aspect, wherein more than one ceramic tape is applied to the machined surface.

A fifteenth aspect relates to the method of any preceding aspect, wherein applying heat and pressure to the compression assembly comprises vacuum bagging, autoclaving, laminating, and/or mechanical pressing.

A sixteenth aspect relates to the method of any preceding aspect, wherein the compression assembly is heated at a consolidation temperature in a range from about 90° C. to about 150° C.

A seventeenth aspect relates to the method of any preceding aspect, wherein the compression assembly further comprises flexible compression multilayers on opposing sides of the fiber preform to secure the tool and the ceramic tape during the application of heat and pressure.

An eighteenth aspect relates to the method of any preceding aspect, wherein the heat and pressure are applied in a controlled environment comprising a vacuum or inert gas atmosphere.

A nineteenth aspect relates to the method of any preceding aspect, wherein the protective surface layer comprises a surface feature selected from the group consisting of: a seal slot, an antirotation slot, and a loading pad.

A twentieth aspect relates to a gas turbine engine component comprising a ceramic matrix composite having the protective surface layer formed by the method of any preceding aspect.

In addition to the features mentioned in each of the independent aspects enumerated above, some examples may show, alone or in combination, the optional features mentioned in the dependent aspects and/or as disclosed in the description above and shown in the figures.

What is claimed is:

1. A method to produce a protective surface layer having a predetermined topography on a ceramic matrix composite, the method comprising:
    applying a slurry layer to a surface of a fiber preform;
    drying the slurry layer to form a particulate layer;
    machining a surface of the particulate layer to improve surface smoothness, thereby producing a machined surface;
    attaching a ceramic tape to the machined surface;
    placing a tool on the ceramic tape, the tool comprising one or more features to be imprinted, thereby forming a compression assembly; and
    applying heat and pressure to the compression assembly to consolidate and bond the ceramic tape to the machined surface while the one or more features are imprinted, thereby forming a protective surface layer having a predetermined topography.

2. The method of claim 1, wherein the fiber preform comprises a slurry-infiltrated fiber preform or a melt-infiltrated fiber preform.

3. The method of claim 2, wherein the fiber preform comprises the slurry-infiltrated fiber preform, and further comprising, after forming the protective surface layer, infiltrating the fiber preform with a molten material and cooling, thereby forming a ceramic matrix composite having the protective surface layer.

4. The method of claim 2, wherein the fiber preform comprises the melt-infiltrated fiber preform, and wherein the protective surface layer is formed on a ceramic matrix composite.

5. The method of claim 1, wherein the slurry layer is applied by spraying, spin coating, dipping, or brushing.

6. The method of claim 1, wherein the slurry layer comprises ceramic particles in a carrier liquid comprising an aqueous or organic liquid, the carrier liquid being removed upon drying.

7. The method of claim 6, wherein the ceramic particles are selected from the group consisting of: silicon carbide particles, silicon nitride particles, and silicon nitrocarbide particles, and
    wherein the slurry layer further comprises other particles selected from the group consisting of: silicon particles and carbon particles.

8. The method of claim 1, wherein drying is carried out at room temperature for a time duration from two hours to 24 hours.

9. The method of claim 1, wherein, after machining, the machined surface has an average surface roughness $R_a$ of about 100 micro-in or less.

10. The method of claim 1, wherein the ceramic tape comprises ceramic particles and an organic binder, the ceramic particles being selected from the group consisting of: silicon carbide particles, silicon nitride particles, and silicon nitrocarbide particles.

11. The method of claim 10, wherein the ceramic tape further comprises other particles selected from the group consisting of: silicon particles and carbon particles.

12. The method of claim 1, wherein the ceramic tape has a thickness in a range from about 50 µm to about 250 µm.

13. The method of claim 10, wherein, prior to attaching the ceramic tape to the machined surface, an adhesive comprising the organic binder is deposited onto the machined surface.

14. The method of claim 1, wherein more than one ceramic tape is applied to the machined surface.

15. The method of claim 1, wherein applying heat and pressure to the compression assembly comprises vacuum bagging, autoclaving, laminating, and/or mechanical pressing.

16. The method of claim 1, wherein the compression assembly is heated at a consolidation temperature in a range from about 90° C. to about 150° C.

17. The method of claim 1, wherein the compression assembly further comprises flexible compression multilayers on opposing sides of the fiber preform to secure the tool and the ceramic tape during the application of heat and pressure.

18. The method of claim 1, wherein the heat and pressure are applied in a controlled environment comprising a vacuum or inert gas atmosphere.

19. The method of claim 1, wherein the protective surface layer comprises one or more surface features selected from the group consisting of: a seal slot, an antirotation slot, and a loading pad.

20. A gas turbine engine component comprising a ceramic matrix composite having the protective surface layer formed by the method of claim 1.

* * * * *